(12) United States Patent
Tang et al.

(10) Patent No.: US 11,056,859 B2
(45) Date of Patent: Jul. 6, 2021

(54) SPARK PLUG ELECTRODE AND METHOD FOR MANUFACTURING THIS SPARK PLUG ELECTRODE AND SPARK PLUG INCLUDING A SPARK PLUG ELECTRODE

(71) Applicant: Robert Bosch GmbH, Stuttgart (DE)

(72) Inventors: Zhuo Tang, Reutlingen (DE); Dennis Quest, Bamberg (DE); Stefan Nufer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/639,199

(22) PCT Filed: Jul. 31, 2018

(86) PCT No.: PCT/EP2018/070778
§ 371 (c)(1),
(2) Date: Feb. 14, 2020

(87) PCT Pub. No.: WO2019/034416
PCT Pub. Date: Feb. 21, 2019

(65) Prior Publication Data
US 2020/0176956 A1    Jun. 4, 2020

(30) Foreign Application Priority Data
Aug. 17, 2017  (DE) .......................... 102017214311.8

(51) Int. Cl.
*H01T 21/02* (2006.01)
*B23K 26/21* (2014.01)
(Continued)

(52) U.S. Cl.
CPC .............. *H01T 21/02* (2013.01); *B23K 26/21* (2015.10); *H01T 13/39* (2013.01); *B23K 2101/36* (2018.08)

(58) Field of Classification Search
CPC .......... H01T 21/02; H01T 13/39; B23K 26/21; B23K 2101/36; B23K 26/323; B23K 26/0823; B23K 26/082
See application file for complete search history.

(56) References Cited

U.S. PATENT DOCUMENTS

| 5,448,130 | A  | * | 9/1995 | Matsutani | H01T 13/39 313/141 |
| 2004/0189169 | A1 | * | 9/2004 | Taniguchi | H01T 21/02 313/141 |

(Continued)

FOREIGN PATENT DOCUMENTS

| CN | 102522701 A | 6/2012 |
| DE | 10103045 A1 | 7/2002 |

(Continued)

OTHER PUBLICATIONS

International Search Report dated Oct. 23, 2018 of the corresponding International Application PCT/EP2018/070778 filed Jul. 31, 2018.

*Primary Examiner* — Tracie Y Green
(74) *Attorney, Agent, or Firm* — Norton Rose Fulbright US LLP; Gerard Messina (57) ABSTRACT

A spark plug electrode includes an electrode base body made of a first material and an ignition element made of a second material and forming an ignition surface for a spark plug. The electrode base body and the ignition element are integrally joined to each other via a welding seam. A mixing rate for the first or second materials is less than 15 weight percent in a half of the welding seam adjacent to the ignition element. A method for manufacturing a spark plug electrode includes: providing an electrode base body and an ignition element; carrying out a welding process joining the electrode base body and the ignition element while forming a welding seam, where a welding beam guided over the (Continued)

surface of the spark plug electrode by tilting a reflection element, thereby producing a welding seam at a joining point between the electrode base body and the ignition element.

20 Claims, 4 Drawing Sheets

(51) Int. Cl.
  *H01T 13/39* (2006.01)
  *B23K 101/36* (2006.01)

(56) References Cited

U.S. PATENT DOCUMENTS

| | | |
|---|---|---|
| 2004/0192155 A1 | 9/2004 | Taniguchi et al. |
| 2005/0109740 A1* | 5/2005 | Becker ............... B23K 26/22 |
| | | 219/121.64 |
| 2005/0274776 A1* | 12/2005 | Takeda ............... B23K 9/232 |
| | | 228/262.4 |
| 2013/0221832 A1 | 8/2013 | Ishiguro et al. |
| 2016/0001398 A1* | 1/2016 | Kancharla ......... B23K 26/0648 |
| | | 65/112 |

FOREIGN PATENT DOCUMENTS

| | | |
|---|---|---|
| DE | 10243009 B3 | 1/2004 |
| DE | 112011103796 T5 | 8/2013 |
| DE | 102014223792 A1 | 5/2016 |
| EP | 0671793 A1 | 9/1995 |
| EP | 2211433 A1 | 7/2010 |
| JP | 2002050448 A | 2/2002 |
| JP | 2004107205 A | 4/2004 |

* cited by examiner

SPARK PLUG ELECTRODE AND METHOD FOR MANUFACTURING THIS SPARK PLUG ELECTRODE AND SPARK PLUG INCLUDING A SPARK PLUG ELECTRODE

CROSS-REFERENCE TO RELATED APPLICATIONS

The present application is the national stage of International Pat. App. No. PCT/EP2018/070778 filed Jul. 31, 2018, and claims priority under 35 U.S.C. § 119 to DE 10 2017 214 311.8, filed in the Federal Republic of Germany on Aug. 17, 2017, the content of each of which are incorporated herein by reference in their entireties.

FIELD OF THE INVENTION

The present invention relates to a spark plug electrode, a spark plug including the spark plug electrode, and a method for manufacturing the spark plug electrode.

BACKGROUND

The service life of a spark plug is limited due to the durability of its components. One of these components is the spark plug electrode or the material of which the spark plug electrode is manufactured. During its utilization in an internal combustion engine, the spark plug electrode and its material are constantly subjected to corrosion and erosion processes. Due to the oxidation of the material of the spark plug electrode and of the ignition-spark plasma during the operation of the internal combustion engine, the spark gap between the spark plug electrodes enlarges over time, whereby the spark plug loses its ignitability and must be replaced.

Correspondingly, finding material and material combinations having a high resistance to corrosion and erosion is an objective of present-day research. Spark plug electrodes made up of now utilized nickel alloys have a service life of approximately 30,000 km through 60,000 km. Spark plug electrodes made up of noble metal alloys have a service life of 60,000 km through 90,000 km and, due to their material costs, are considerably more expensive than spark plug electrodes made up of a nickel alloy.

In order to reduce the material costs, an electrode base body made up of a nickel alloy is frequently combined with an ignition element made up of a noble metal or a noble metal alloy. The electrode base body and the ignition element are integrally joined to each other using a welding method. Frequently utilized noble metals are platinum and iridium as well as alloys including these elements.

The noble metal alloy and the nickel alloy have different thermal expansion coefficients, however, so that mechanical stresses occur in the welding seam. In the extreme case, the welding seam breaks and the noble metal-based ignition element drops off the electrode base body, whereby the spark plug becomes unusable. These problems are more pronounced in Ir-based ignition elements than in Pt-based ignition elements, since the thermal expansion coefficient between Ir alloys and Ni alloys differs by a factor of 2.

There are various welding methods, whereby an attempt is made to produce a stable welding seam between the ignition element and the electrode base body. Laser welding is very widespread in the joining of Ir-based ignition elements to Ni-based base bodies. DE 10 103 045 A1 describes, for example, a laser welding process in which a CW laser beam is statically directed onto the joining area of the ignition element and the electrode base body, and the spark plug electrode rotates about its longitudinal axis or the laser beam rotates about the spark plug electrode. EP 0 671 793 A1 describes a similar method, although, in this case, a pulsed laser beam is statically directed onto the joining area. In DE 2014 10 223 792 A1, two welding seams, which are slightly offset with respect to each other, are produced using one static laser beam.

In the case of the spark plugs available today, the noble metal-containing ignition element and the electrode base body have generally been welded using one of the two aforementioned processes and have the above-described problems.

SUMMARY OF THE INVENTION

An object of the present invention is to provide a spark plug electrode and a manufacturing method therefor, in which the aforementioned problems are minimized and the spark plug electrode and the spark plug have a preferably long service life.

This object is achieved by the spark plug electrode according to the present invention, which includes an electrode base body made up of a first material and an ignition element made up of a second material and forming an ignition surface of a spark plug, which are integrally joined to each other via a welding seam, in that a mixing rate D for the first material or for the second material is less than 15 weight percent in a half of the welding seam adjacent to the ignition element.

In order to ascertain mixing rate D, line scans are carried out in the welding seam in order to ascertain the element concentration along these lines. The lines for the scans typically have equidistant spacings with respect to one another and extend perpendicularly to a longitudinal axis of the ignition element, i.e., in parallel to the diameter of the welding seam.

Preferably, a line scan is carried out on the ignition element in order to determine a reference value for the element concentration of the first material and of the second material. A further line scan preferably takes place on the boundary surface between the ignition element and the welding seam. Additionally, any number of further line scans can be carried out in the welding seam. Advantageously, at least four line scans are used as the basis for the determination of the mixing rate. For each line scan, a value for the element concentration in the particular line results for the first material and for the second material. In the case of alloys, it is, for example, sufficient to ascertain only the concentration of the main component and to perform an evaluation in order to determine mixing rate D. On the basis of the element concentration determined for each line, the mean value and the associated standard deviation are calculated for each material or element. The standard deviation is then mixing rate D, which is a measure for the distribution of the elements and the particular material in the welding seam. The smaller mixing rate D is, the more uniform is the distribution of the elements in the welding seam. Research carried out by the applicant has shown that, the more uniform the distribution of the elements is, the lesser are the differences in the thermal expansion coefficient between the ignition element, the welding seam, and the electrode base body; and the mechanical stress at the boundary surfaces also decreases to a corresponding extent. Therefore, the likelihood of crack formation in the welding seam decreases and the service life of the spark plug increases. Mixing rate D is therefore also a quality feature for the welding seam and the welding.

For an example including four line scans (n=4), the mixing rate is calculated as follows:

$$D = \sqrt{\frac{1}{n-1} * \sum_{i=1}^{n} (L_i - \bar{L})^2},$$

in which
D mixing rate,
n number of line scans,
$L_i$ element concentration in the $i^{th}$ line,
$\bar{L}$ mean value of the element concentration.

In this case, the mean value is:

$$\bar{L} = \frac{1}{n} \sum_{i=1}^{n} L_i$$

In order to determine a reference value for the element concentration of the first material and/or of the second material, first line scan $L_1$ is carried out outside the welding seam, on the ignition element.

A uniform distribution does not necessarily mean that the first material mixes with the second material in the welding seam and forms a new alloy. The research carried out by the applicant has shown that, for a stable and long-life welding seam, it is also entirely advantageous when there are areas in the welding seam, which are essentially made up of the first material and/or essentially of the second material and/or essentially of a mixture of the first material and the second material. During the line scan over these various areas, the material concentration or the element concentration is averaged across these areas. Mixing rate D then indicates how uniformly these different areas are distributed in the welding seam.

A further result of the research carried out by the applicant is also that the undesirable cracks in the spark plug electrodes according to the related art form mainly in the half of the welding seam adjacent to the ignition element. Therefore, it is sufficient for the determination of the quality of the welding seam to ascertain mixing rate D for the half of the welding seam facing the ignition element.

It is possible, of course, to increase the number of line scans, the size of the investigated area in the welding seam, and/or also the number of investigated elements and materials and, therefore, to reduce the uncertainty of the measurement of mixing rate D and simultaneously increase the significance of mixing rate D.

The research carried out by the applicant has shown that it is more advantageous when mixing rate D is less than or equal to 12 weight percent. Particularly good results were achieved for spark plug electrodes in which mixing rate D is less than or equal to 10 weight percent for the first material or the second material in the half of the welding seam adjacent to the ignition element.

Alternatively, it is also advantageous when mixing rate D for the first material and the second material is less than 15 weight percent, in particular less than or equal to 12 weight percent, particularly preferably even less than or equal to 10 weight percent. As a result, it is ensured that there is a preferably homogeneous distribution of both materials in the welding seam.

Preferably, the first material for the electrode base body is nickel or a nickel alloy including Ni as the main component or the greatest single component. In order to meet the condition for mixing rate D, it is sufficient when the Ni portion in the first material maintains the limit for mixing rate D. A first material based on Ni has the advantage that it is easy to process and has low material costs.

Additionally or alternatively, it is desirable that the second material for the ignition element is a noble metal or a noble metal alloy, in particular, the noble metal being at least one element from the group: Ir, Pt, Pd, Rh, Ru, Re, Os, Au, Ag, and being the main component or the greatest individual component in the alloy. In order to meet the condition for mixing rate D, it suffices when the noble metal portion in the second material maintains the limit for mixing rate D. A second material based on a noble metal has the advantage that the resultant ignition element has high corrosion resistance and erosion resistance.

A further aspect of the present invention relates to a spark plug that includes at least one spark plug electrode according to the present invention. Preferably, this spark plug electrode is designed as a center electrode.

A third aspect of the present invention relates to a manufacturing method for a spark plug electrode, in particular for a spark plug electrode as described. The manufacturing method includes the steps of: providing the electrode base body and the ignition element; and carrying out a welding process for joining the electrode base body and the ignition element while forming a welding seam, where a welding beam is directed, via a reflection element, onto a joining point between the electrode base body and the ignition element and producing the welding seam, and the welding beam is guided over the surface of the ignition electrode by tilting the reflection element in order to produce the welding seam.

Due to the tilting, in particular, a periodic tilting, of the reflection element, a spatial modulation of the welding beam results on the surface of the spark plug electrode.

Due to this spatial modulation, the weld pool arising at the joining point and at the joining surface of the ignition element to the electrode base body is imparted with an additional dynamic that effectuates an additional mixture to the mixing of the first material with the second material driven by the thermodynamics. Due to this welding method, the molten first material or the second material is imparted with a substantially greater range and can move further within the weld pool, from which the welding seam arises, and partially mix with the other material.

The reflection element is, for example, a mirror or a so-called scanner.

Preferably, it is provided that the welding beam is guided along a line on the surface of the ignition electrode, the line being parallel to a longitudinal axis X of the ignition element. Advantageously, this longitudinal axis extends through the joining surface between the ignition element and the electrode base body, i.e., also through the eventual welding seam.

It has been found to be advantageous when the reflection element is tilted at a frequency of at least 1000 Hz. For example, the reflection element is tilted at a frequency of 1200 Hz. As a result, the welding beam essentially executes a motion in parallel to longitudinal axis X of the ignition element and repeatedly passes over the same line or the same area.

This is also supported, for example, when the spark plug electrode rotates during the welding process and the rotation frequency of the spark plug electrode is less than the frequency at which the reflection element is tilted. Due to the relatively fast tilting of the reflection element as compared to the rotation of the spark plug electrode, the welding beam executes a quasi scanner motion on the surface of the spark plug electrode.

The welding beam can be, for example, a laser beam, in particular of a CW laser, such as a disk laser or a fiber laser. In combination with a scanner as a reflection element, a laser scanner welding method results for the welding process.

Due to the above-described various embodiments of the manufacturing method according to the present invention, a mixing rate D of less than 15 weight percent for the first material and/or the second material results in the welding seam.

Thus, advantageous effects, described above with respect to the spark plug electrode according to the present invention, result in this case as well.

DETAILED DESCRIPTION

Figure 1:
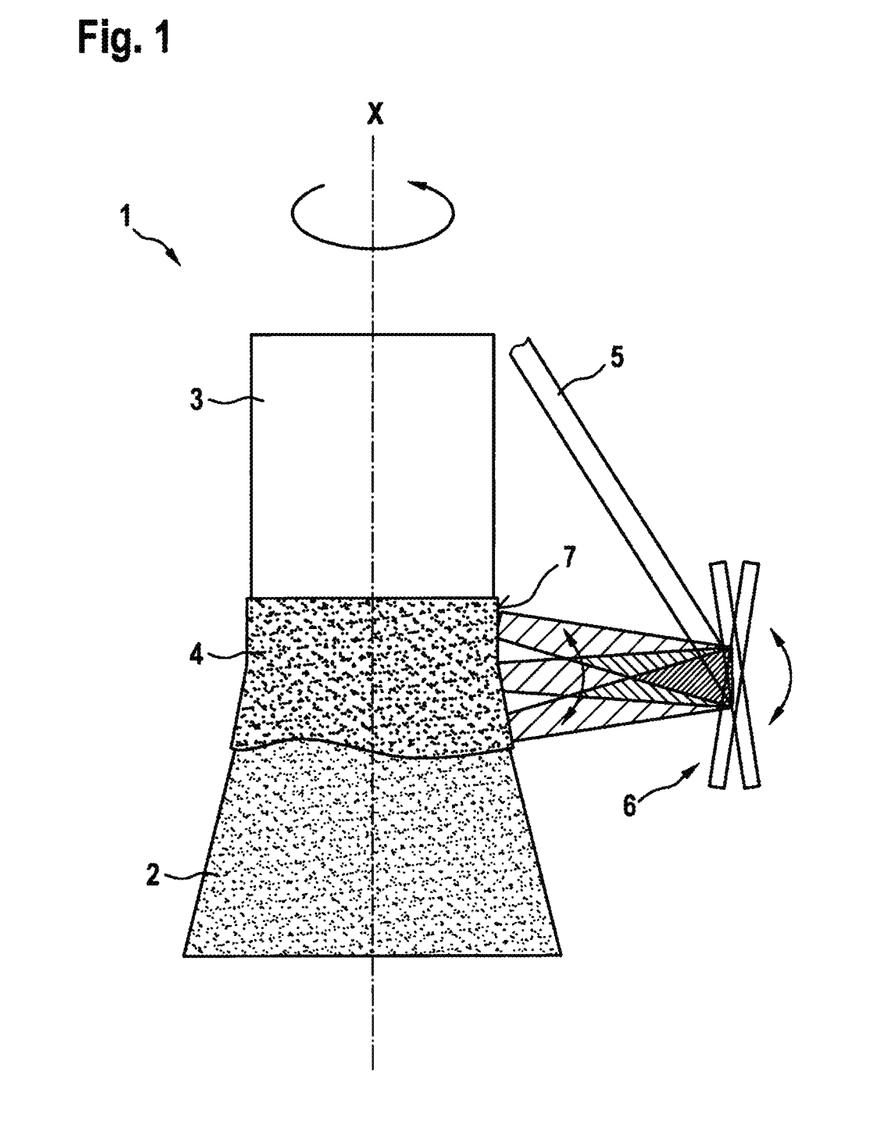
FIG. 1 shows a manufacturing method for a spark plug electrode according to an example embodiment of the present invention.

FIG. 1 schematically shows an example of a manufacturing method according to the present invention. A spark plug electrode 1 is represented, including an electrode base body 2, an ignition element 3, and a welding seam 4 that integrally joins electrode base body 2 and ignition element 3 to each other. Ignition element 3 has a longitudinal axis X, which extends perpendicularly to the joining surface between ignition element 3 and electrode base body 2, or to welding seam 4 after the welding process. The ignition element is designed, for example, in the form of a pin. Spark plug electrode 1 has a surface 7 formed by the surface of ignition element 3 and the surface of electrode base body 2. The area of the surface of the ignition electrode around the joining surface between electrode base body 2 and ignition element 3 is also referred to as the joining point. First, the weld pool and, thereafter, welding seam 4 arise, during the welding process, at the joining surface and the joining point.

Using a reflection element 6, for example, a mirror, welding beam 5, for example, a laser beam, is directed onto the joining point between electrode base body 2 and ignition element 3 and, there, produces welding seam 4. Such a welding method is, for example, the laser scanner welding method, in which a laser beam is directed, via a scanner, onto the objects to be welded and produces a welding seam. Due to the movement of the scanner, the laser beam is guided to the desired position with respect to the objects. Typically, CW lasers, such as a fiber laser or a disk laser, are utilized for generating the laser beam.

Typically, the weld pool for welding seam 4 on spark plug electrode 1 extends at least up to longitudinal axis X of ignition element 3, so that, after a rotation of ignition electrode 1 about longitudinal axis X during the welding process, the joining surface between electrode base body 2 and ignition element 3 has been completely fused, i.e., welding seam 4 extends across the entire diameter of ignition element 3.

Reflection element 6 is periodically tilted during the radiation of welding beam 5 onto surface 7 of ignition electrode 1, so that welding beam 5 is guided along surface 7 in a periodic motion. Preferably, the motion is parallel to longitudinal axis X of ignition element 3. Due to this spatial modulation of the radiation of welding beam 5, a substantially higher dynamic and better mixing of the first material and second material in welding seam 4 is achieved in the weld pool at the joining surface between ignition element 3 and electrode base body 2.

Typically, reflection element 6 at a frequency of at least 1000 Hz, in this case, for example, 1200 Hz, is tilted. The rotation of ignition electrode 1 about longitudinal axis X of ignition element 3 has a substantially lower frequency.

Figure 2A:
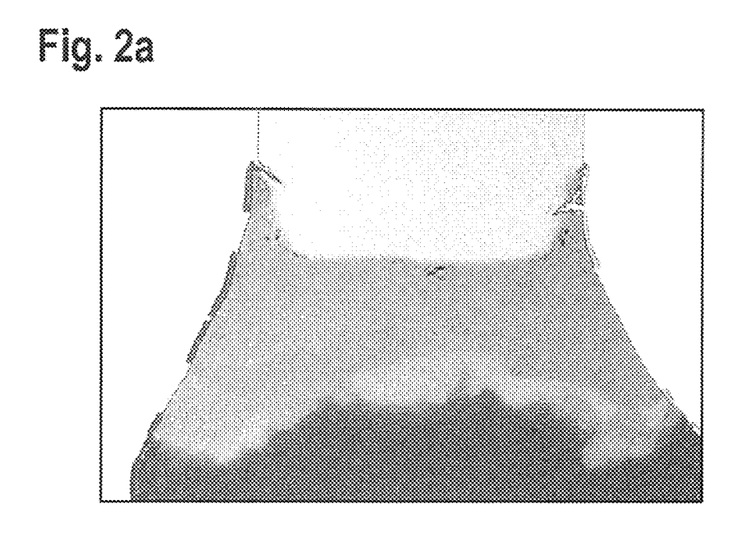
FIGS. 2a-2c show images of an energy dispersive X-ray spectroscopy (EDX) measurement on a spark plug electrode according to an example embodiment of the present invention and on two spark plug electrodes according to the related art.
Figure 2B:
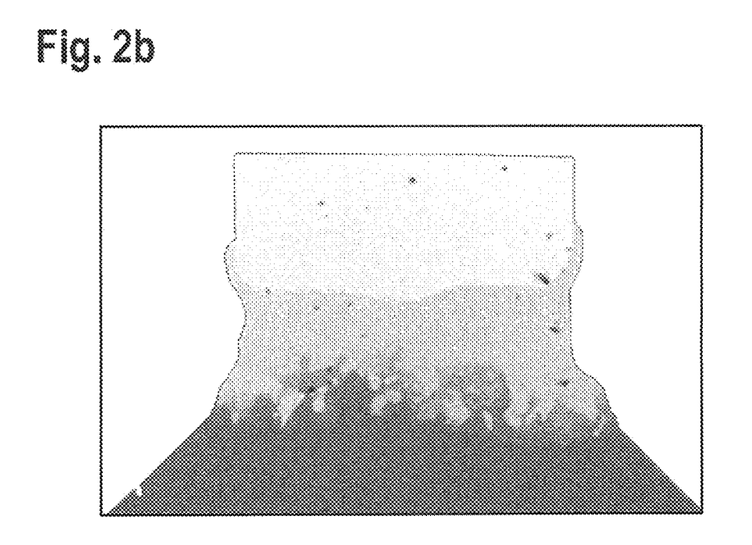
Figure 2C:
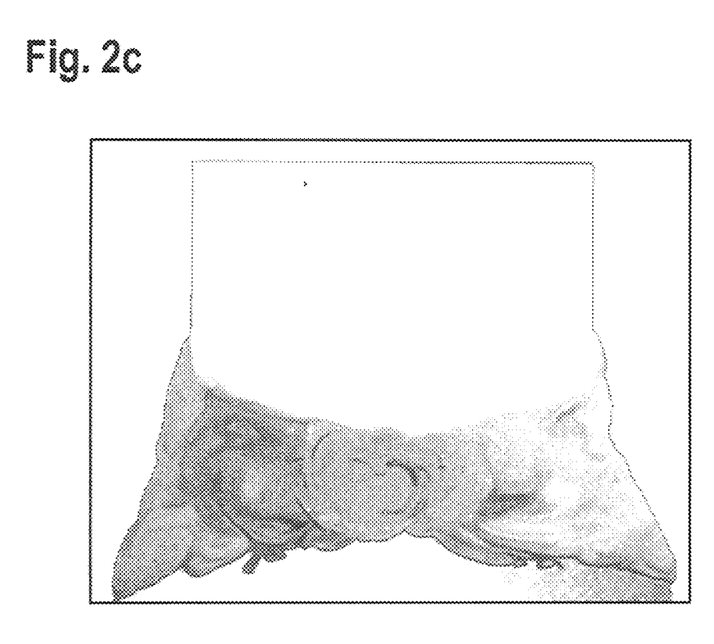

In FIGS. 2a-2c show EDX images of ground surfaces of three ignition electrodes 1 manufactured using different welding methods. In sample 1 (P1) in FIG. 2a, the welding seam was produced using a CW laser beam statically radiating onto the joining point, spark plug electrode 1 having rotated about its longitudinal axis. The ignition element is made up of iridium. The electrode base body is made up of an Ni alloy. Sample 2 (P2), FIG. 2b, is a spark plug electrode 1 including an electrode base body 2 based on Ni and an ignition element 3 made up of an Ir alloy. The welding seam in sample 2 was produced using a pulsed laser. Sample 3 in FIG. 2c shows a spark plug electrode 1 according to an example embodiment of the present invention, which was manufactured using the manufacturing method according to an example embodiment of the present invention. Using a scanner 6, a CW laser beam 5 was guided across spark plug electrode surface 7. Ignition element 3 is made up of an Ir alloy and the electrode base body is made up of a Ni alloy.

The shades of gray in the images of the ground surfaces reflect different element concentrations. The welding seam of sample 1 appears to have a fairly uniform gray coloring. The welding seam of sample 2, however, shows considerable eddies having different shades of gray. In sample 3, the welding seam shows larger and smaller areas having different shades of gray, which are relatively sharply delineated from one another.

Figure 3A:
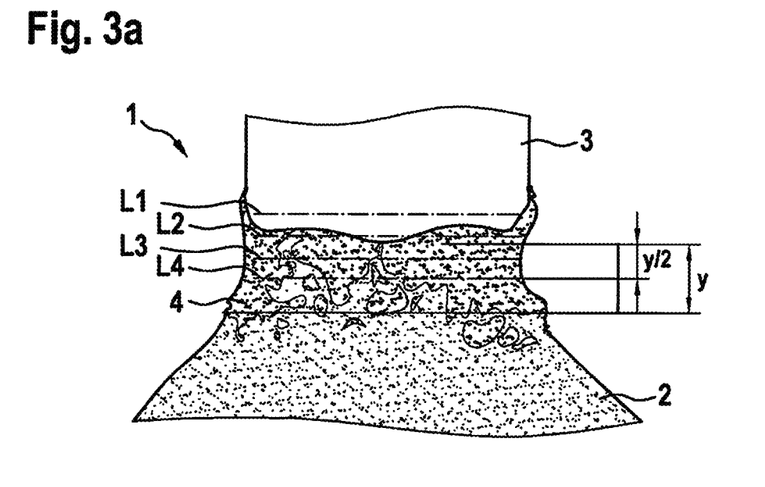
FIG. 3a shows an ascertainment of mixing rate D according to an example embodiment of the present invention.

Mixing rate D is ascertained for each sample in order to determine the quality of a welding seam. In order to determine mixing rate D, initially, width y of the welding seam is determined along the extension of longitudinal axis X of ignition element 3. The element concentration of the two main elements of electrode base body 2 and of ignition element 3, in this case, Ni and Ir, is determined along four lines perpendicular to longitudinal axis X of ignition element 3. One line L4 is measured in the center of the welding seam at y/2, measured from the edge of the welding seam (upper edge) adjacent to the ignition element. A second line L2 is measured at the upper edge of the welding seam. A third line L3 is measured along one-half the distance between line 4 and line 3. A final line L1 is measured, as the reference, in ignition element 3, lines 1-4 all having the same distance from one another. The lines cover 90% of the diameter of the welding seam or of the diameter of the welding seam at the upper edge when the diameter is not constant. The center points of the lines lie on the extension of longitudinal axis X of ignition element 3. The element concentration along a line was ascertained using EDX analysis and, therefore, is an average across areas possibly having a different concentration, as seen, for example, in sample 2 and sample 3. In FIG. 3a, the arrangement of lines L1, L2, L3, and L4 is represented using sample P3 according to the present invention as an example.

TABLE 1

|  | Sample 1 (P1) | | Sample 2 (P2) | | Sample 3 (P3) | |
| --- | --- | --- | --- | --- | --- | --- |
|  | Ni (wt %) | Ir (wt %) | Ni (wt %) | Ir (wt %) | Ni (wt %) | Ir (wt %) |
| Line 1 (L1) | 6.8 | 93.2 | 10.6 | 69.0 | 0.0 | 88.5 |
| Line 2 (L2) | 46.2 | 53.8 | 35.0 | 42.8 | 14.8 | 71.4 |
| Line 3 (L3) | 62.9 | 37.1 | 43.0 | 34.0 | 19.1 | 71.6 |
| Line 4 (L4) | 57.5 | 42.5 | 41.2 | 36.5 | 19.8 | 72.8 |
| Mean value | 43.4 | 56.7 | 32.5 | 45.6 | 13.4 | 76.1 |
| D | 25.3 | 25.3 | 15.0 | 16.0 | 9.2 | 8.3 |

In Table 1, the element concentrations for the three samples and the four lines for each of the elements Ni and Ir are provided. In the samples, the base body was made up mainly of Ni and the ignition element was made up mainly of Ir. The percentage remaining in some samples is made up of Rh and other elements, which were not taken into consideration in the analysis of the welding seam.

In each sample, a mean value is formed across the four lines for each element. Mixing rate D corresponds to the standard deviation from the mean value for each element. The smaller mixing rate D is, the smaller is the standard deviation also. This corresponds, in turn, on average, to a relatively homogeneous element distribution in the welding seam.

For this example including four line scans (n=4), the mixing rate is calculated as follows:

$$D = \sqrt{\frac{1}{n-1} * \sum_{i=1}^{n} (L_i - \bar{L})^2},$$

in which
D mixing rate,
n number of line scans,
$L_i$ element concentration in the $i^{th}$ line,
$\bar{L}$ mean value of the element concentration.

In this case, the mean value is:

$$\bar{L} = \frac{1}{n} \sum_{i=1}^{n} L_i$$

In order to determine the reference value for the element concentration of the first material (nickel) and of the second material (iridium), the first line scan $L_1$ is carried out outside the welding seam, at the ignition element.

Figure 3B:
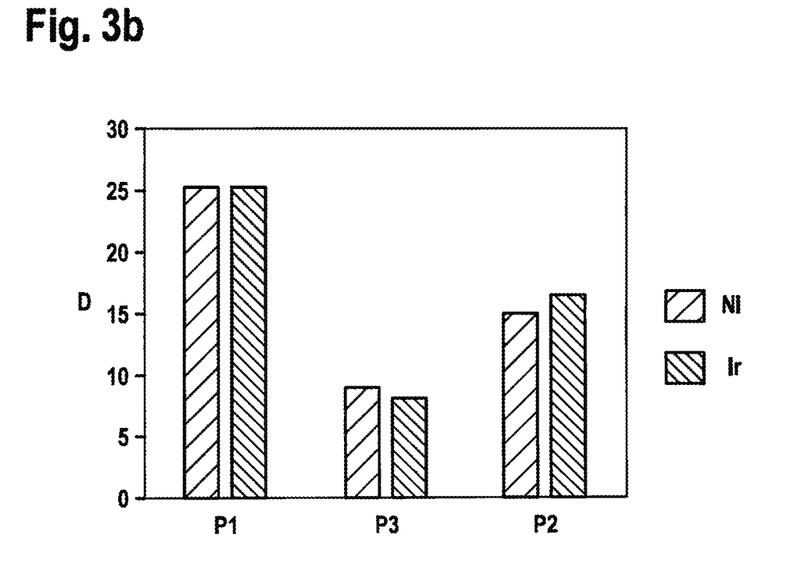
FIG. 3b shows mixing rate D for two elements for each of two samples, manufactured using known welding methods, as compared to a sample according to an example embodiment of the present invention.

In FIG. 3b, the two mixing rates D for Ni and Ir are graphically represented for each sample. The two samples 1 and 2 according to the related art have a mixing rate, for both elements, of at least 15 weight percent. The research carried out by the applicant has shown that the welding seam is particularly more stable, the smaller the mixing rate is. For sample 3 according to the present invention, a mixing rate of less than 10 weight percent results for the elements.

Within the scope of the research carried out by the applicant, research was also carried out, in which EDX line scans equidistantly distributed across the entire width y of the welding seam were carried out and, on the basis thereof, according to the above-described procedure, the mean value and the standard deviation or mixing rate D were determined for the elements. The results for mixing rate D ascertained across the entire width do not differ substantially from mixing rate D ascertained across one-half the width. Moreover, the research has shown that, in the case of ignition electrodes according to the related art, the cracks and fractures in the welding seam arise in the upper half of the welding seam, i.e., in the half of the welding seam facing the ignition element. Therefore, a quality control or an improvement of the welding seam specifically for the upper half of the welding seam improves the long-term durability of the spark plug. In order to increase the efficiency of the quality analysis and quality control, the focus is placed on the upper half of the welding seam for the determination of the mixing rate.

What is claimed is:

1. A spark plug electrode, comprising:
an electrode base body made up of a first material; and
an ignition element made up of a second material, forming an ignition surface for a spark plug, and being integrally joined to the electrode base body via a welding seam;
wherein the ignition element has a longitudinal axis which extends perpendicularly to a joining surface between the ignition element and the electrode base body, or to the welding seam,
wherein the ignition element is in the form of a pin,
wherein the spark plug electrode has a surface formed by a surface of the ignition element and a surface of electrode base body, wherein the area of the surface of the ignition electrode around the joining surface between the electrode base body and the ignition element is a joining point,
wherein a weld pool and the welding seam arise, during the welding, at the joining surface and the joining point,
wherein the weld pool for the welding seam on the spark plug electrode extends at least up to the longitudinal axis of the ignition element, so that, after a rotation of the ignition electrode about the longitudinal axis during the welding, the joining surface between the electrode base body and the ignition element is completely fused, so that the welding seam extends across an entire diameter of the ignition element, and
wherein a mixing rate for the first material or for the second material is less than 15 weight percent in a half of the welding seam that is adjacent to the ignition element.

2. The spark plug electrode of claim 1, wherein the mixing rate is less than or equal to 12 weight percent.

3. The spark plug electrode of claim 1, wherein the mixing rate is less than or equal to 10 weight percent.

4. The spark plug electrode of claim 1, wherein the mixing rate for the first material and the second material is less than 15 weight percent.

5. The spark plug electrode of claim 1, wherein the mixing rate for the first material and the second material is less than or equal to 12 weight percent.

6. The spark plug electrode of claim 1, wherein the first material is nickel or a Ni alloy including Ni as its main component and/or the second material is a noble metal or a noble metal alloy.

7. The spark plug of claim 6, wherein the second material is the noble metal, and the noble metal includes at least one element from the group consisting of Ir, Pt, Pd, Rh, Ru, Re, Ag, Au, and Os.

8. A spark plug, comprising:
a spark plug electrode, including:
an electrode base body made up of a first material; and
an ignition element made up of a second material, forming an ignition surface for a spark plug, and being integrally joined to the electrode base body via a welding seam;
wherein the ignition element has a longitudinal axis which extends perpendicularly to a joining surface between the ignition element and the electrode base body, or to the welding seam,
wherein the ignition element is in the form of a pin,
wherein the spark plug electrode has a surface formed by a surface of the ignition element and a surface of electrode base body, wherein the area of the surface of the ignition electrode around the joining surface between the electrode base body and the ignition element is a joining point,
wherein a weld pool and the welding seam arise, during the welding, at the joining surface and the joining point,
wherein the weld pool for the welding seam on the spark plug electrode extends at least up to the longitudinal axis of the ignition element, so that, after a rotation of the ignition electrode about the longitudinal axis during the welding, the joining surface between the electrode base body and the ignition element is completely fused, so that the welding seam extends across an entire diameter of the ignition element, and
wherein a mixing rate for the first material or for the second material is less than 15 weight percent in a half of the welding seam that is adjacent to the ignition element.

9. The spark plug of claim 8, wherein the spark plug electrode is a center electrode.

10. A method for manufacturing a spark plug electrode, the method comprising:
providing an electrode base body made up of a first material and an ignition element made up of a second material; and
welding to each other the electrode base body and the ignition element, thereby forming a welding seam, wherein the welding includes tilting a reflection element to direct a welding beam over a surface of the spark plug electrode thereby producing a welding seam joining the electrode base body and the ignition element;
wherein the ignition element has a longitudinal axis which extends perpendicularly to a joining surface between the ignition element and the electrode base body, or to the welding seam,
wherein the ignition element is in the form of a pin,
wherein the spark plug electrode has a surface formed by a surface of the ignition element and a surface of electrode base body, wherein the area of the surface of the ignition electrode around the joining surface between the electrode base body and the ignition element is a joining point,
wherein a weld pool and the welding seam arise, during the welding, at the joining surface and the joining point, and
wherein the weld pool for the welding seam on the spark plug electrode extends at least up to the longitudinal axis of the ignition element, so that, after a rotation of the ignition electrode about the longitudinal axis during the welding, the joining surface between the electrode base body and the ignition element is completely fused, so that the welding seam extends across an entire diameter of the ignition element.

11. The method of claim 10, wherein the welding beam is guided along a line on the surface, and the line is parallel to a longitudinal axis of the ignition element.

12. The method of claim 10, wherein the tilting of the reflection element is at a frequency of at least 1000 Hz.

13. The method of claim 12, wherein the welding includes rotating the spark plug electrode at a rotation frequency that is less than a frequency at which the reflection element is tilted.

14. The method of claim 10, wherein a mixing rate for the first material and/or for the second material in a half of the welding seam that is adjacent to the ignition element is less than 15 weight percent.

15. The method of claim 10, wherein the welding beam is a laser beam.

16. The method of claim 10, wherein the welding is by a laser scanner welding method.

17. The method of claim 16, wherein the reflection element is a scanner.

18. The method of claim 10, wherein the mixing rate is determined by determining a width y of the welding seam along an extension of the longitudinal axis of the ignition element, wherein a concentration of the elements of the electrode base body and of the ignition element is determined along four lines perpendicular to the longitudinal axis of the ignition element, wherein a fourth line is measured in a center of the welding seam at y/2, measured from an upper edge of the welding seam adjacent to the ignition element, wherein a second line is measured at the upper edge of the welding seam, a third line is measured along one-half the distance between the fourth line and the third line, a first line is measured, as a reference, in the ignition element, wherein the first, second, third and fourth lines all have the same distance from one another, and wherein the lines cover more than half of the diameter of the welding seam or of the diameter of the welding seam at the upper edge when the diameter is not constant, and wherein each of the lines include a center point that lies on the extension of the longitudinal axis of the ignition element.

19. The spark plug electrode of claim 1, wherein the mixing rate is determined by determining a width y of the welding seam along an extension of the longitudinal axis of the ignition element, wherein a concentration of the elements of the electrode base body and of the ignition element is determined along four lines perpendicular to the longitudinal axis of the ignition element, wherein a fourth line is measured in a center of the welding seam at y/2, measured from an upper edge of the welding seam adjacent to the ignition element, wherein a second line is measured at the upper edge of the welding seam, a third line is measured along one-half the distance between the fourth line and the third line, a first line is measured, as a reference, in the ignition element, wherein the first, second, third and fourth lines all have the same distance from one another, and wherein the lines cover more than half of the diameter of the welding seam or of the diameter of the welding seam at the upper edge when the diameter is not constant, and wherein each of the lines include a center point that lies on the extension of the longitudinal axis of the ignition.

20. The spark plug of claim 8, wherein the mixing rate is determined by determining a width y of the welding seam along an extension of the longitudinal axis of the ignition element, wherein a concentration of the elements of the electrode base body and of the ignition element is determined along four lines perpendicular to the longitudinal axis of the ignition element, wherein a fourth line is measured in a center of the welding seam at y/2, measured from an upper edge of the welding seam adjacent to the ignition element, wherein a second line is measured at the upper edge of the welding seam, a third line is measured along one-half the distance between the fourth line and the third line, a first line is measured, as a reference, in the ignition element, wherein the first, second, third and fourth lines all have the same distance from one another, and wherein the lines cover more than half of the diameter of the welding seam or of the diameter of the welding seam at the upper edge when the diameter is not constant, and wherein each of the lines include a center point that lies on the extension of the longitudinal axis of the ignition.

* * * * *